United States Patent
Koike et al.

[11] Patent Number: 5,391,987
[45] Date of Patent: Feb. 21, 1995

[54] SYNCHRONOUS POSITION CORRECTION SYSTEM FOR A LINEAR SYNCHRONOUS MOTOR TRAIN

[75] Inventors: Shigeyoshi Koike; Tetsuro Noguchi, both of Katsuta, Japan

[73] Assignees: Hitachi, Ltd.; Hitachi Techno Engineering Co., Ltd., both of Tokyo, Japan

[21] Appl. No.: 903,980

[22] Filed: Jun. 26, 1992

[51] Int. Cl.$^6$ .................. G01B 7/14; H01R 33/025
[52] U.S. Cl. .................. 324/207.12; 324/207.24; 246/249
[58] Field of Search .................. 324/207.15, 207.16, 324/207.17, 207.22, 207.23, 207.24, 207.25, 207.26, 207.12; 246/77, 187 R, 187 B, 202, 246, 249, DIG. 1

[56] References Cited

U.S. PATENT DOCUMENTS

| | | | |
|---|---|---|---|
| 3,250,983 | 5/1966 | Atkinson | 324/207.15 X |
| 4,611,169 | 9/1986 | Hermann | 324/207.17 |
| 4,788,498 | 11/1988 | Uemura | 324/207.16 |
| 4,808,923 | 2/1989 | Posseme | 324/207.17 |
| 4,866,380 | 9/1989 | Meins et al. | 324/207.16 |
| 5,041,785 | 8/1991 | Bogaerts et al. | 324/207.24 |
| 5,115,195 | 5/1992 | Peterson et al. | 324/207.24 X |
| 5,208,538 | 5/1993 | Sakanishi et al. | 324/207.17 X |

*Primary Examiner*—Gerard R. Strecker
*Assistant Examiner*—Warren S. Edmonds
*Attorney, Agent, or Firm*—Antonelli, Terry, Stout & Kraus

[57] ABSTRACT

A synchronous position correction system for a self-controlled linear synchronous motor train includes a position detector for detecting a positional relationship between a propulsion winding provided on a track and a field pole provided on the train which is formed by a plurality of cars. A synchronous operation of the formed train is performed at a phase which is obtained by correcting a phase detected by the position detector on the basis of a difference between an average phase of the whole of the formed train and the phase detected by the position detector, at a phase which is obtained by correcting the phase detected by the position detector on the basis of a difference between the phase of a speed electromotive force of the whole of the formed train and the phase detected by the position detector, or at a phase which is detected by the position detector in conjunction with the position of a central car of the formed train. As a result, a propulsive force is prevented from being deteriorated due to a phase shift caused by an error in train length and it is possible to operate the formed train at an optimal phase at which the best efficiency is obtained.

10 Claims, 2 Drawing Sheets

SYNCHRONOUS POSITION CORRECTION SYSTEM FOR A LINEAR SYNCHRONOUS MOTOR TRAIN

BACKGROUND OF THE INVENTION

The present invention relates to a synchronous position correction system for a linear synchronous motor train having a propulsion winding provided on the ground or a track and a field pole provided on the train.

In a typical conventional method, a relationship between a train-borne field and a ground propulsion winding is determined in such a manner that an induced voltage caused by a train-borne high frequency oscillator is detected on the ground by a cross induction winding disposed on the ground, as disclosed on pages 48 to 52 of LINEAR MOTOR CAR MAGLEV published by Seibunsha.

SUMMARY OF THE INVENTION

The train-borne high frequency oscillator is placed at a position an integer times that of the position of a field pole of a head car (or tail car) of a composed or formed train so that a relationship between the oscillator and a ground propulsion coil becomes clear.

Though an example of a very long formed train as a train using a linear synchronous motor has not been developed as yet, a position detector will be provided at one location of the train to drive the linear motor by an output signal of the detector. For example, a very long formed train having fourteen to sixteen cars will have a train length of about 400 m. In this case, an error in train length will amount to ±20 to 30 cm. Provided that a pole pitch is 1.5 m, a relationship between a train-borne field and a ground propulsion coil causes a phase difference of 36° between a head car and a tail car.

When a phase shift of $\theta$ is involved, this phase shift affects a driving or propulsive force in the form of cos $\theta$. Therefore, the above phase difference remarkably deteriorates the propulsive force.

As mentioned above, a very long formed train having a position detector provided at one location of the train has a problem that the propulsive force is deteriorated due to a phase shift caused by an error in train length.

An object of the present invention is to operate a formed train at a phase at which the best efficiency is obtained.

To that end, in the present invention, an average synchronous phase of a formed train is determined to correct a position signal (or a phase) detected by a position detector.

The average phase of the formed train can be determined by a method in which the average is taken from a phase detected in conjunction with a head car and a phase detected in conjunction with a tail car, a method in which the position detection is made in conjunction with the middle (or a central car) of the train, or a method in which the average phase is obtained by detecting a speed electromotive force.

DESCRIPTION OF THE PREFERRED EMBODIMENTS

Embodiments of the present invention will now be explained in reference to the accompanying drawings.

Figure 1:
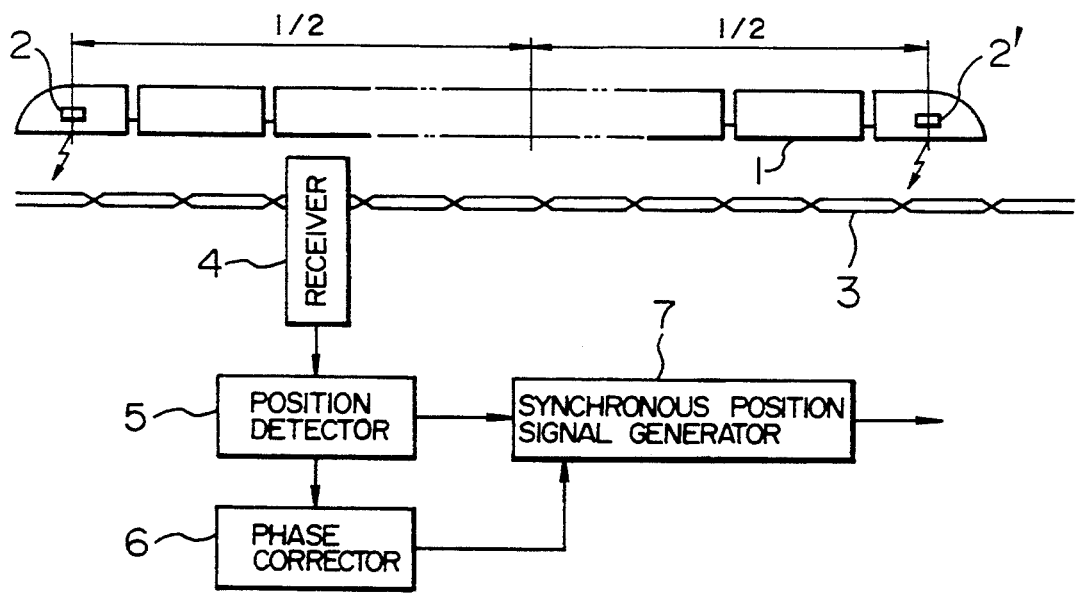
FIG. 1 is a block diagram showing an embodiment of the present invention.

FIG. 1 shows an embodiment of the present invention. In FIG. 1, oscillators 2 and 2' for position detection are provided at a head car and a tail car of a running train 1, respectively. Generally, the detection of the position of a running train is made at the position of a head car taking the lead in a running direction and all controls inclusive of a feeder section change-over control, a block control and a speed control are made on the basis of the position detection. The detection of the position of a tail car is used as a spare for the head car and for making controls when the running direction is reversed.

The position of the train is obtained by converting a signal, which is received from the output of the position detection oscillators 2, 2' by inductive wires 3, to a sine wave signal by a position detector 5. The detailed explanation is described in the aforementioned prior technical material.

The position detection oscillator 2 of the head car and the position detection oscillator 2' of the tail car are disposed so that the same phase is provided. Therefore, if there is no error in train length, the oscillators 2 and 2' provide quite the same phase.

In the case where there is a phase shift, an output of the position detection oscillator 2 of the head car, when the running train is stopped, is detected through a ground receiver 4 by a position detector 5 to detect a phase $\theta_f$ which is in turn supplied to a phase corrector 6. Similarly, a phase $\theta_b$ is detected by the position detection oscillator 2' of the tail car and is supplied to the phase corrector 6.

The phase corrector 6 determines a difference $\theta_f - \theta_b$ between the head car phase $\theta_f$ and the tail car phase $\theta_b$. Provided that the phase changes uniformly, a phase at the center of the train (or a point equal to a half of the train length) is an average phase. Therefore, the phase corrector 6 outputs a value of the phase difference $\theta_f - \theta_b$ multiplied by $\frac{1}{2}$ as a correction amount. A synchronous position signal generator 7 subtracts the correction amount $(\theta_f - \theta_b)/2$ from the head car phase $\theta_f$ and outputs the value of subtraction as an average phase. In the case where the reference is made to the tail car, the correction amount is added to the head car phase.

Namely, when the train runs, a value obtained by subtracting (or adding) the correction amount, detected or determined during the stopping of the train, from (or to) the phase $\theta_f$ detected by the position detector 5 always provides an average phase of the running train 1.

Figure 2:
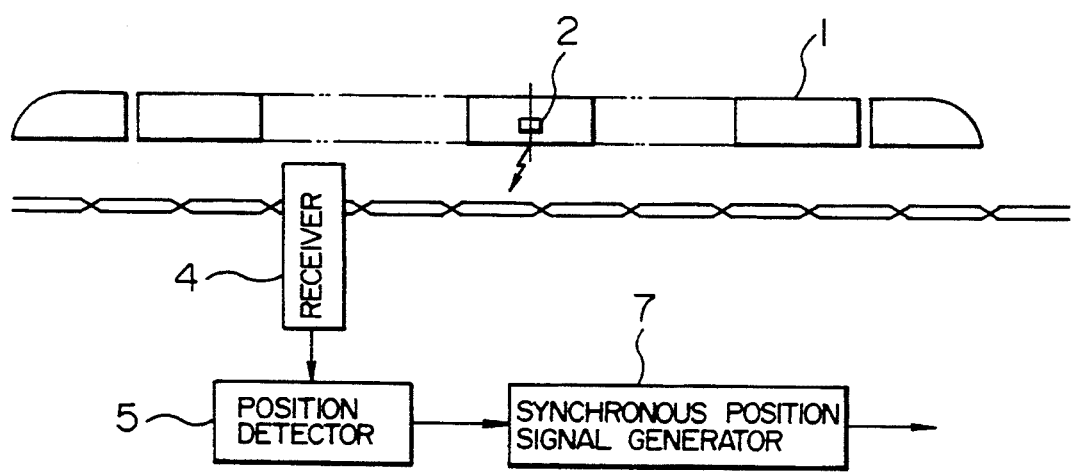
FIG. 2 is a block diagram showing another embodiment of the present invention.

FIG. 2 shows another embodiment of the present invention. In the present embodiment, a position detection oscillator 2 of a running train 1 is placed at a central car of the running train. An output of the position detection oscillator 2 is inputted through a receiver 4 to a position detector 5 which, in turn, detects a phase. The detected phase is sent to a synchronous position signal generator 7. Thus, the position detection is disposed in the middle of the running train, thereby providing an effect of detecting such an average phase as explained in conjunction with FIG. 1.

Figure 3A:
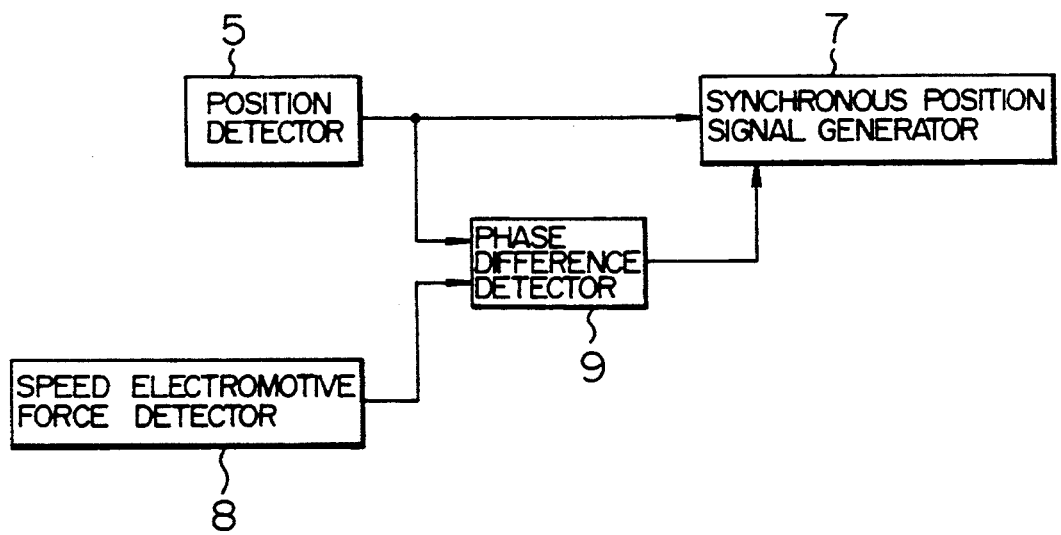
FIG. 3(a) and 3(b) show a block diagram of a further embodiment of the present invention and diagram illustrating a phase difference pertaining thereto.

FIG. 3(a) shows a further embodiment of the present invention. In the present embodiment, a speed electromotive force (or counter electromotive force) of the whole of a (or entire) running train 1 is determined and the phase of this speed electromotive force is used as an average phase of the running train 1, as will be explained in the following.

A speed electromotive force of the whole of a running train is determined by a speed electromotive force detector 8. The speed electromotive force can be determined by a known method. Namely, a power transducer output voltage and a speed electromotive force have the following relation therebetween:

$$E_s = I_a Z - e_a \quad (1)$$

where $E_s$ is the power transducer output voltage, $I_a$ a power transducer output current, $e_a$ the speed electromotive force, and $Z$ a circuit impedance (or the resistance and inductance of a feeder line and the resistance and inductance of a propulsion coil). The circuit impedance $Z$ is beforehand measured and the power transducer output voltage $E_s$ and the power transducer output current $I_a$ are also measured. The speed electromotive force $e_a$ can be determined by introducing the measured values into equation (1).

A propulsive force becomes the maximum when the phase of the speed electromotive force and the phase of the current becomes the same. Accordingly, if the phase of the speed electromotive force is used as a synchronous position, it is possible to run a very long formed train at an optimal phase (or an average phase of the very long train) even in the case where a phase shift occurs in the very long formed train.

However, it does not necessarily follow that the speed electromotive force is stably obtained always. For example, in the case where there is a failure of the closing of a feeder section switch or in the case where the train speed is very slow, it is not possible to detect the speed electromotive force.

Therefore, in the present embodiment, a phase detected by a cross induction winding or coil, which always outputs a stabilized phase, is corrected and the corrected phase is used as a synchronous position.

Figure 3B:
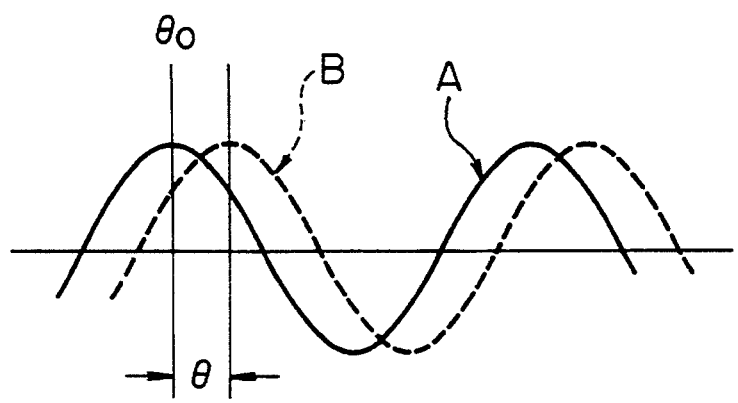

In FIG. 3(b), a difference $\theta$ between the phase of an output of the cross induction winding determined in conjunction with a head car or tail car (see a sine wave A shown in FIG. 3) and the phase of the speed electromotive force (see a sine wave B) is determined by a phase difference detector 9.

Such n phase differences are determined over at least 360° of the sine wave A and an average value of those phase differences is defined as a correction amount $\Delta\theta$.

A synchronous position signal generator 7 adds the correction amount $\Delta\theta$ to the phase obtained from the cross induction winding and outputs the result of the addition as a synchronous position signal. The correction amount $\Delta\theta$ may be negative.

According to the present embodiment, there is provided an effect that an optimal phase can be outputted always.

The average phase of a very long formed train can also be determined by the following method.

Namely, the train is run or operated under the same condition of gradient and with a train speed and a current being kept constant. A phase obtained from a cross induction winding at that time is changed positively and negatively by a possible train expansion/contraction angle (about 40 cm at the greatest in the case of a formed train of 400 m), and an angle, at which an output voltage becomes the maximum, is defined as a correction amount $\Delta\theta$.

In the two examples mentioned above, it does not necessarily follow that the correction amount $\Delta\theta$ provides an accurate correction value always. This is because the length of the formed train may change. Accordingly, it is necessary to reset or change the correction amount each time the train length makes a change.

The cause of a change in formed train length may include the expansion/contraction of cars resulting from a change in temperature such as a temperature difference between the summer and the winter (about 40 cm in the case of a 400 m formed train) and a change in train length resulting from the change of formation of a train.

Further, it is of course understood that the correction amount differs for each train formation. Therefore, it is necessary to determine a correction amount conformable to each train formation.

In the embodiments explained in conjunction with FIGS. 1 and 3, the position detection oscillator is provided at a head car or a tail car. However, since the correction is ultimately made, the position detection oscillator may be provided at any car or any location of a formed train.

We claim:

1. A synchronous position correction system for a linear synchronous motor train, formed by a plurality of cars, and having a propulsion winding provided on the ground and a field pole provided on said train, said train having a synchronous position detector for detecting a positional relationship between said propulsion winding and said field pole of said train when running and when said train is stopped, characterized in that said synchronous position correction system includes:
   phase correction means for obtaining beforehand a correction amount determined by an average phase of the whole of said train and a phase obtained through said synchronous position detector, from an output of inductive wires, and
   synchronous position signal generating means for correcting the phase obtained from the output of said inductive wires by means of an output of said phase correction means to generate the synchronous position signal when said train is running.

2. A synchronous position correction system for a linear synchronous motor train according to claim 1, characterized in that said synchronous position detector detects a positional relationship between said propulsion winding and said field pole through receiving a signal from oscillating means for position detection, provided on said train, via an output of said inductive wires on the ground.

3. A synchronous position correction system for a linear synchronous motor train according to claim 2, characterized in that said train is provided with a plurality of said oscillation means, an average value of a plurality of phases outputted by said phase correction means, indicative of outputs obtained from the plural oscillating means via outputs of said inductive wires, is used as the average phase of the whole of said train.

4. A synchronous position correction system for a linear synchronous motor train according to claim 3, characterized in that the average value of said plurality of said phases is obtained when said train is stopped.

5. A synchronous position correction system for a linear synchronous motor train according to claim 1, characterized in that the average phase of the whole of said train corresponds to a phase of a speed electromotive force of said linear synchronous motor for driving said train.

6. A synchronous position correction system for a linear synchronous motor train according to claim 2, characterized in that the average phase of the whole of said train is made by determining a phase at which power outputted by a power transducer, for driving said linear synchronous motor, becomes maximum when the phase obtained from an output of said inductive wires is changed in a section including when there is no change in gradient and without changing a train speed and a current of said train.

7. A synchronous position correction system for a linear synchronous motor train according to claim 1, wherein the phase correction amount is changed in accordance with a change in temperature and/or a change in formation of the formed train.

8. A synchronous position correction system for a linear synchronous motor train formed by a plurality of cars and having a propulsion winding provided on the ground and a field pole provided on the train, said synchronous position correction system including a synchronous position detector for receiving, via inductive wires on the ground, an output from oscillating means for position detection, provided at a location on said train proximate a central car thereof, and for providing a synchronous position signal of a running train, via a synchronous position signal generator, in response to detection of a positional relationship between said propulsion winding and said field pole, by said synchronous position detector, in accordance with an output from said oscillating means for position detection provided on said train, via said inductive wires on the ground.

9. A synchronous position correction system for a linear synchronous motor train according to claim 2, characterized in that said oscillating means is provided at each of a head car and tail car of said train, an average value of phases outputted by said phase correction means, indicative of outputs obtained from both of said oscillating means, via outputs of said inductive wires, is used as the average phase of the whole of said train.

10. A synchronous position correction system for a linear synchronous motor train according to claim 9, characterized in that the average value of said phases is obtained when said train is stopped.

* * * * *